(No Model.)
W. HOLBERTON.
ARTIFICIAL FLY.
No. 341,331. Patented May 4, 1886.
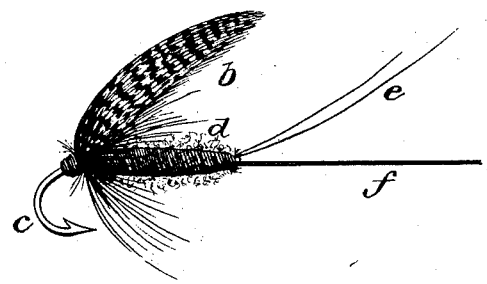
WITNESSES:
INVENTOR:
W. Holberton
BY Munn & Co
ATTORNEYS.

UNITED STATES PATENT OFFICE.

WAKEMAN HOLBERTON, OF HACKENSACK, ASSIGNOR TO CHARLES F. IMBRIE, OF JERSEY CITY, NEW JERSEY.

ARTIFICIAL FLY.

SPECIFICATION forming part of Letters Patent No. 341,331, dated May 4, 1886.

Application filed January 30, 1886. Serial No. 190,305. (No model.)

*To all whom it may concern:*

Be it known that I, WAKEMAN HOLBERTON, of Hackensack, Bergen county, and State of New Jersey, have invented a new and useful Improvement in Artificial Flies, of which the following is a full, clear, and exact description.

This invention relates to that description of artificial bait used in angling, commonly known as an "artificial fly," in which the hook used to catch fish is dressed so as to resemble a fly or other like insect, and forms what has been termed a "fly-hook." Heretofore these artificial flies or fly-hooks have had the fly proper so constructed and combined with and arranged upon the hook proper that the laterally-projecting flexible portions, which correspond to the wings of the fly, and may also include other portions of the insect outside of its body, have been made to occupy an acute angular position relatively to the forward end of the hook. Thus the portion corresponding to the wings has been set inclining forward in an outer direction from the point where the same joins what corresponds to the body of the insect. This construction and arrangement of the fly on the hook has not only caused the wings or laterally-projecting flexible outer parts of the imitation insect to spread out and present considerable resistance to the air when casting the line, thereby making the fly liable to drop off the hook, but, and which is of great importance, has caused the wing-like parts or flexible laterally-projecting members to wrap or lie so close to the body and hook when working the fly in the water, particularly where a current prevails, that the life-like motion of the fly is very materially interfered with, and thus the attractiveness of the bait to the fish is seriously impaired.

My invention consists in an artificial fly or fly-hook in which the hook proper has combined with and arranged upon it an imitation fly, the wings or laterally-projecting flexible portions of which are made to occupy an obtuse angle relatively to the forward end of the hook, and to sit inclining backward in an outward direction from the point where the same joins what corresponds to the body of the insect. This arrangement of the wings or outer flexible parts of the fly will cause the same to collapse or close when casting the line, thus reducing the resistance to the air, and rendering the fly much less liable to become detached, and will cause said parts to expand and to give to the imitation fly a much more life-like motion when working it in the water or current.

Reference is to be had to the accompanying drawing, forming a part of this specification, the figure in which represents a side view of my improved artificial fly or fly-hook with gut attached for securing it to the fishing-line.

The imitation fly is or may be made of feathers, wool, mohair, silk, velvet, gold and silver tinsel, and furs of various kinds, or other suitable materials. It may be arranged upon any part of the hook—as, for instance, with its winged or laterally-projecting portion $b$ near the front bent and barbed end $c$ of the hook, as shown in the drawing; but in every instance said flexible portion or portions $b$ occupy an obtuse angle to the forward end of the hook, and stand out inclining backwardly in an outward direction relatively to the hook from where said outer flexible parts join the body part $d$ of the insect, for the purpose or purposes hereinbefore named, and the tail $e$, antennæ, and other outer flexible members of the fly may be disposed to produce like effects.

The fly may be lashed or attached to the hook in the ordinary or any suitable way, and the fly-hook either be provided or not with gut $f$, for securing it to the fishing-line.

Having thus fully described my invention, I claim as new and desire to secure by Letters Patent—

1. In an artificial fly or fly-hook, the combination, with the hook proper, of an attached imitation fly having its parts which correspond to the wings of the insect arranged to project inclining backward in an outward direction, and to occupy an oblique position relatively to the forward end of the hook, substantially as and for the purpose or purposes specified.

2. In an artificial fly or fly-hook, the combination, with the hook proper, of an attached imitation fly having its exterior flexible members arranged to stand out from the hook, and to incline backward in an outward direction relatively to the forward end of the hook on different sides of the said hook, substantially as shown and described.

WAKEMAN HOLBERTON.

Witnesses:
C. SEDGWICK,
EDWD. M. CLARK.